United States Patent [19]
Bendicks

[11] Patent Number: 5,278,425
[45] Date of Patent: Jan. 11, 1994

[54] LENS SYSTEM FOR MOISTURE SENSOR DEVICE

[75] Inventor: Norbert Bendicks, Hemer, Fed. Rep. of Germany

[73] Assignee: Leopold Kostal GmbH & Co. KG, Fed. Rep. of Germany

[21] Appl. No.: 5,582

[22] Filed: Jan. 19, 1993

[51] Int. Cl.$^5$ .............................................. G01N 15/06
[52] U.S. Cl. .................................... 250/574; 250/216
[58] Field of Search ................... 250/227.25, 216, 564, 250/573, 574, 903; 356/436; 73/293

[56] References Cited

U.S. PATENT DOCUMENTS 5,039,490  8/1991  Marsoner et al. ................... 250/574
5,048,952  9/1991  Miyata et al. ........................ 250/574

FOREIGN PATENT DOCUMENTS 2420594   11/1975  Fed. Rep. of Germany.
3314770C2  11/1987  Fed. Rep. of Germany.

Primary Examiner—David C. Nelms
Assistant Examiner—K. Shami
Attorney, Agent, or Firm—Brooks & Kushman

[57] ABSTRACT

A moisture sensor device for detecting the degree of wetting of a transparent pane by drop-shaped precipitation. The sensor device is provided with a beam guide element, which is affixed to the pane by an optical adhesive. A beam transmitter and a beam receiver are each associated with a lens. Such a sensor device solves the problem of guaranteeing optimum conditions for the generation and output of rays into and out of a beam guide element. Aspherical lenses are associated with and arranged at a short distance from the beam transmitter and the beam receiver. Each lens has a surface facing the beam transmitter or beam receiver which in outline is fashioned according to a polynomial selected to be equal to or greater than the third degree and is developed to form a body of rotation.

18 Claims, 5 Drawing Sheets

LENS SYSTEM FOR MOISTURE SENSOR DEVICE

TECHNICAL FIELD

The present invention is for detecting the quantity or quality or both of precipitation on a transparent pane.

Such devices are used in particular to influence an associated windscreen wiper system of a motor vehicle in dependence upon the quantity of precipitation present on the windscreen.

BACKGROUND ART

DE 33 14 770 C2 discloses a sensor device wherein two lenses are arranged on a beam guide element. One lens is associated with a beam transmitter and the other lens is associated with a beam receiver. The cited publication discloses no details about the construction of the lenses or the way in which they are assigned to the beam transmitter and the beam receiver.

SUMMARY OF THE INVENTION

The aim of the present invention is to develop a sensor device of the type described initially so as to guarantee optimum conditions for the launch and output of the beams into and out of the beam guide element by means of lenses which are relatively easy to manufacture.

Said aim is achieved according to the invention by providing a sensor device for detecting the degree of wetting of a transparent windscreen by drop-shaped precipitation which lies on an outer surface thereof. The sensor device includes a beam transmitter located proximate an inner surface of the windscreen. A beam receiver is disposed in optical communication with the transmitter. A beam guide element is positioned therebetween. The guide element is affixed to an inner surface of the windscreen. It has two faces oriented orthogonally to each other, each face being provided with an aspherical lens which is associated with the beam transmitter or receiver.

The beam transmitter, receiver and guide element are positioned so that rays emitted by the beam transmitter pass through the guide element before and after reflection by the windscreen with an intensity which is a function of the precipitation on the windscreen.

The beam receiver supplies a signal to a control unit, and in turn to a motor-operated windscreen wiping device which is operated in response to the quantity of precipitation.

The lenses are spaced apart from the associated transmitter or receiver and include a lens surface facing the transmitter (III) or receiver.

Each lens surface is at least partially configured according to a polynomial of or greater than the third degree.

The advantage offered by such a construction is that a relatively large fraction of the beams emitted by the beam transmitter may be effectively utilized for measurement purposes.

Further advantageous developments of the device according to the invention are indicated in the subclaims and are described in greater detail with reference to embodiments which are illustrated in the drawings.

The above objects and other objects, features, and advantages of the present invention are readily apparent from the following detailed description of the best mode for carrying out the invention when taken in connection with the accompanying drawings.

Figure 1:
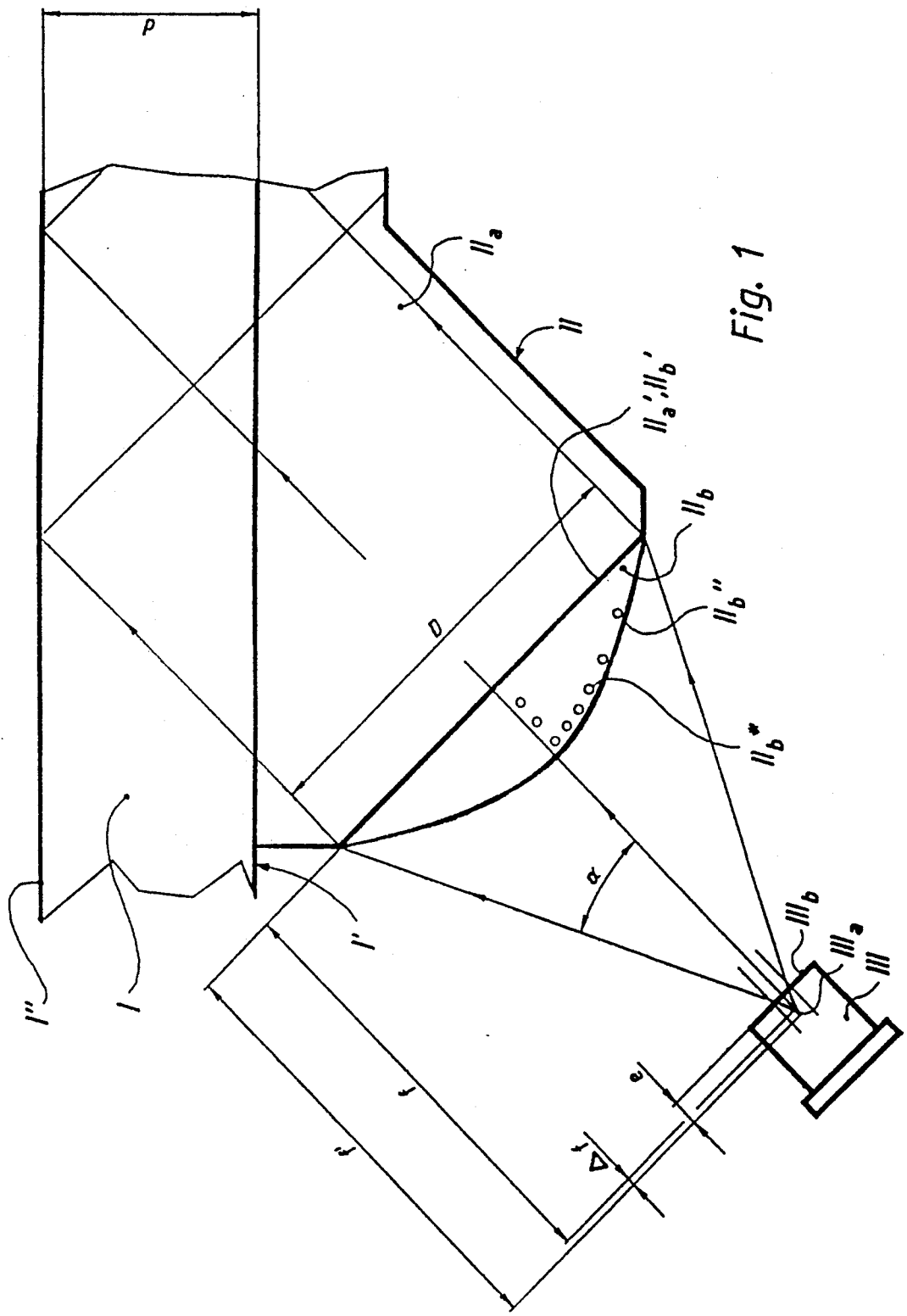
FIG. 1 is a sensor device with its basic components.

For the sake of simplicity, only the beam transmitter side of the sensor device is shown in the drawings.

BEST MODE FOR CARRYING OUT THE INVENTION

As the drawings show, a sensor device is provided for detecting the degree of wetting of a, preferably glass, pane I, in particular, by a drop-shaped precipitation. The device basically comprises a beam guide element II, which is associated on the one hand with a beam transmitter III (e.g. type SFH 485 P manufactured by Siemens) and on the other hand with a beam receiver (e.g. type SFH 205 manufactured by Siemens, not shown for the sake of simplicity). The device is fixed by means of an optical adhesive on the inner surface I' of the pane I which is not exposed to the precipitation.

The pane I is in particular the windscreen of a motor vehicle on which the sensor device, disposed in a housing (also not shown for the sake of simplicity), is provided at a suitable point, i.e. a point of the inner surface I' which does not impair vision but is appropriate for detecting the precipitation. The beam guide element comprises a substantially trapezoidal body IIa, on each of whose two opposing sloping faces IIa' is attached the planar mathematical base IIb' of a geometrical lens IIb. The two identically sized sloping faces II' are arranged on the body IIa in such a way that the center lines of the two geometrical lenses IIb are offset relative to one another by an angle of approximately 90°. The geometrical lenses IIb may be either fixed by their bases II' on the sloping faces IIa', e.g. with the aid in each case of a centering dowel and optical adhesive, or may be integrally formed directly on the body IIa.

In order to launch the rays emitted by the beam transmitter III and forming a divergent beam of rays in an optimum manner into the beam guide element II and hence into the pane I, the lens surface IIb" is fashioned from the edge to the center according to a polynomial. The polynomial is selected to be equal to or greater than the third degree, and is developed to form a rotationally symmetrical body. The polynomial outline may be selected so as to be continuous or discontinuous, the latter case giving rise to a saw-tooth-like contour.

The effect thereby achieved is that the intensity profile does not have a marked maximum in the center, but is presented in a flattened or homogenized form. Compared to a conventional spherical lens, there is the added advantage that parallelism of the rays is achieved also in the edge region of the lens IIb.

In order to further influence the intensity profile, imperfections may also be deliberately provided in a concentration decreasing from the center towards the edge on the surface IIb" of the lens IIb or possibly on the mathematical base IIb' of the lens IIb. The size of the imperfections is selected according to the statistical average droplet size. These imperfections may be either printed or etched on, or they may be in the form of bumps or recesses.

The quasi point-like radiation surface IIIa of the beam transmitter III is associated with the lens IIb thus formed at a distance f' (FIG. 1). The theoretical distance f', which is a function of the radiation angle, is corrected by the difference $\Delta f$ arising from the distance e of the radiation surface IIIa from the ray exit surface IIIb and the thickness and the refractive index of the ray exit surface IIIb.

With such a corrected distance f' and a lens surface constructed in the manner indicated above, it is easily possible to make the diameter D of the lens II at least twice as great as the thickness d of the pane I, resulting in a relatively large measuring surface on the outer surface I" of the pane I.

The optimized intensity profile leads on the one hand to relatively good conditions in an optical sense. On the other hand, the energy efficiency and hence the signal-to-noise ratio is improved. Furthermore, an aspherical lens constructed in said manner has a relatively low overall volume. In terms of the complete sensor device, a compact form of construction may be realized because the beam transmitter III or the beam receiver may be mounted at a very small distance f' from the lens IIb.

The lens which is associated with the beam receiver (not shown) and which is provided at the other end of the beam guide element IIa outputs the rays reflected by the outer surface I" of the pane in the form of a convergent beam of rays. This lens is identical in construction to the lens IIb associated with the beam transmitter III. The variants of the sensor device shown in FIGS. 2 to 5 relate to developments of the lens surface IIb".

Figure 2:
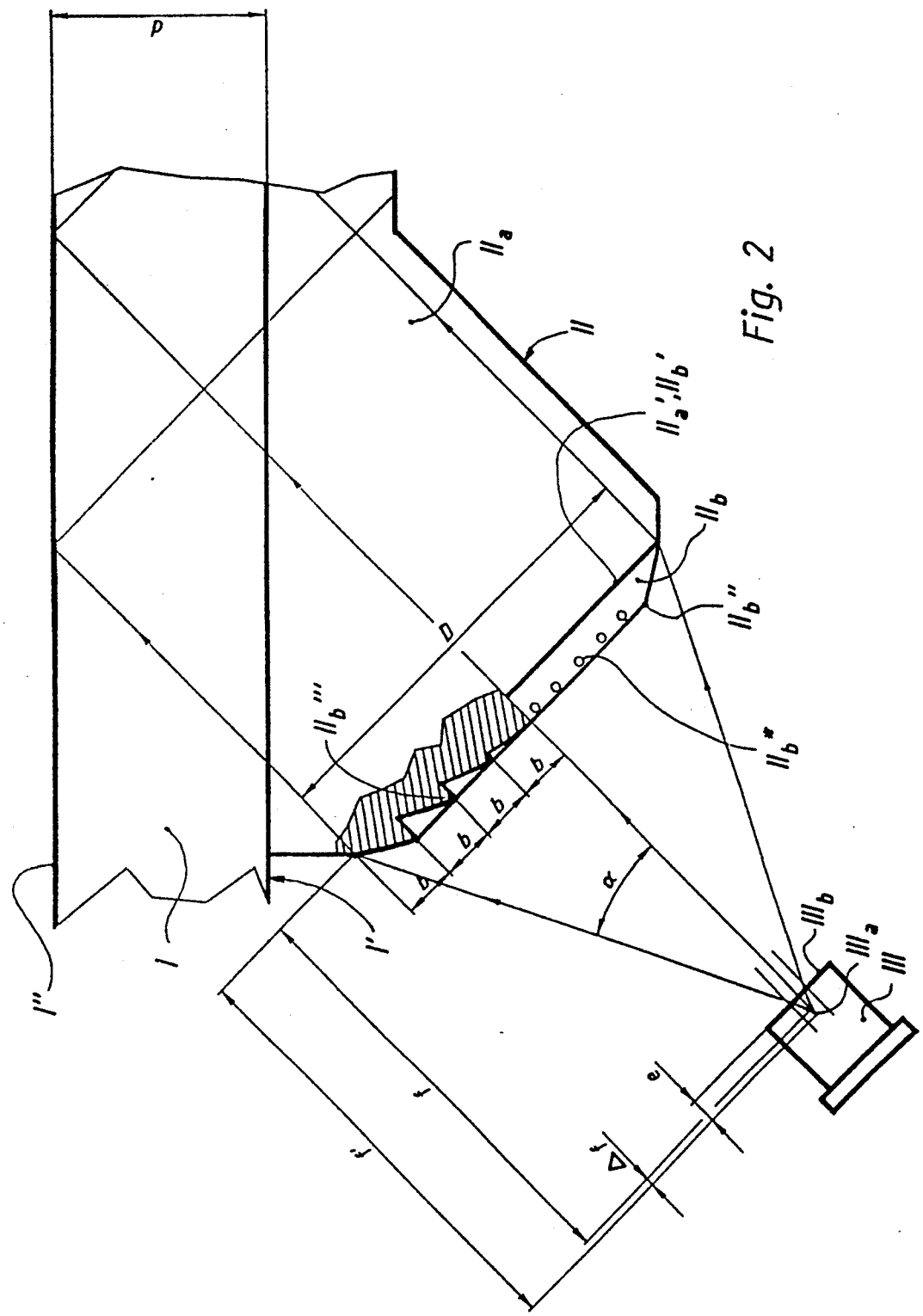
FIG. 2 is a sensor device as in FIG. 1 with a first lens variant.

In the embodiment of FIG. 2, the lens surface IIb" is graduated in steps of uniform width from the edge towards the center. The outline of the individual steps, which are each of the same width b, is fashioned according to a polynomial selected to be equal to or greater than the third degree. In addition, in said variant, the point of origin $II_b'''$ lies in the same depth plane.

Figure 3:
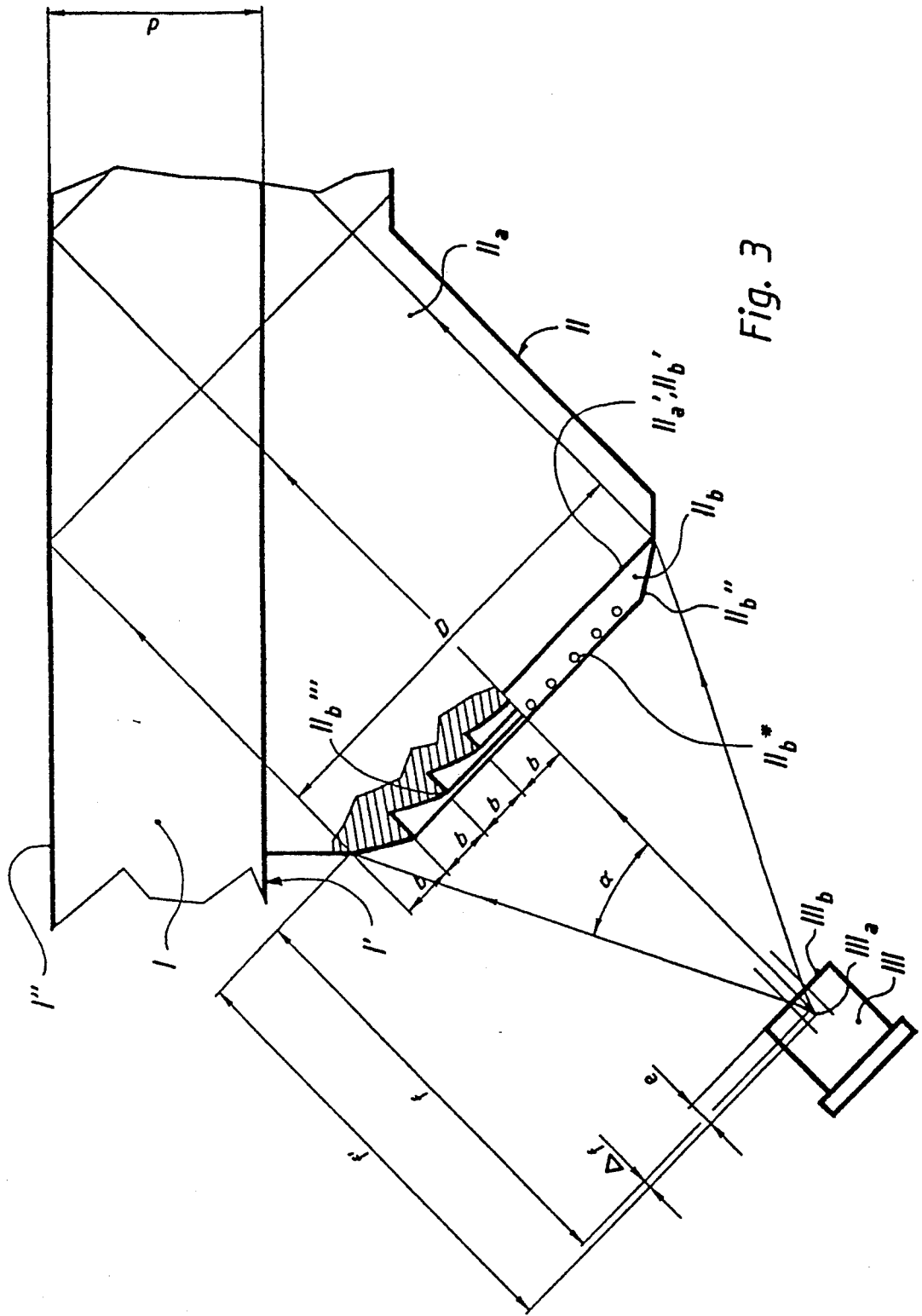
FIG. 3 is a sensor device as in FIG. 1 with a second lens variant.

In the embodiment shown in FIG. 3, the lens surface IIb" is similarly graduated in steps of uniform width. The outline of the individual steps, which are each of the same width b, also is fashioned according to a polynomial selected to be equal to or greater than third degree. In said variant, the points of origin $II_b'''$ of the individual steps lie in different depth planes.

Figure 4:
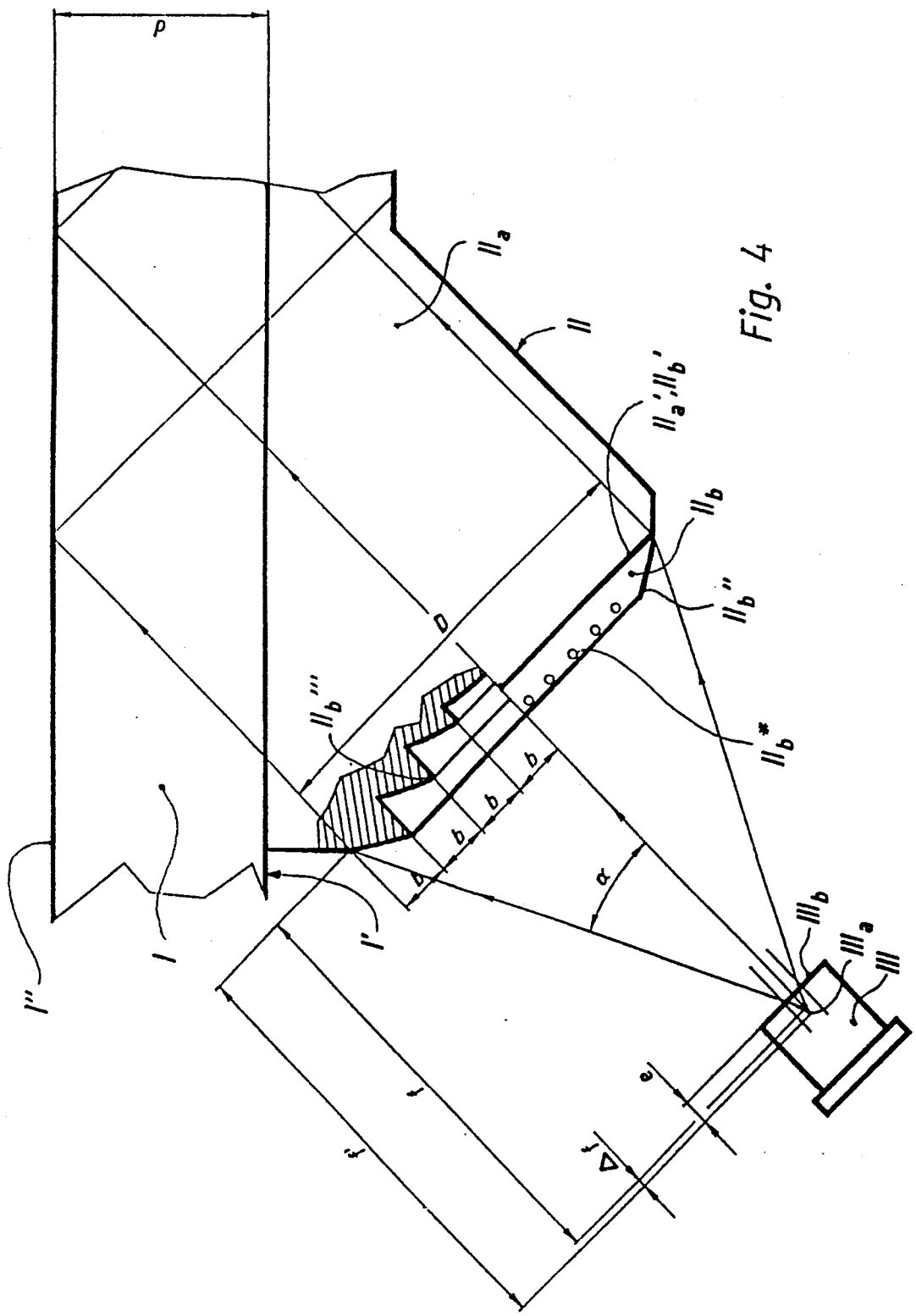
FIG. 4 is a sensor device as in FIG. 1 with a third lens variant.

In the embodiment shown in FIG. 4, the lens surface IIb" is also graduated in steps of uniform width. The outline of the individual steps, which are each of the same width b, also is fashioned according to a polynomial selected to be equal to or greater than third degree. In said variant, the points of origin $II_b'''$ of the individual steps lie in different depth planes in such a way that there is a mass reduction in the center of the lens IIb. This reduction, besides saving weight, offers the added advantage of avoiding sunken points during the manufacturing process.

Figure 5:
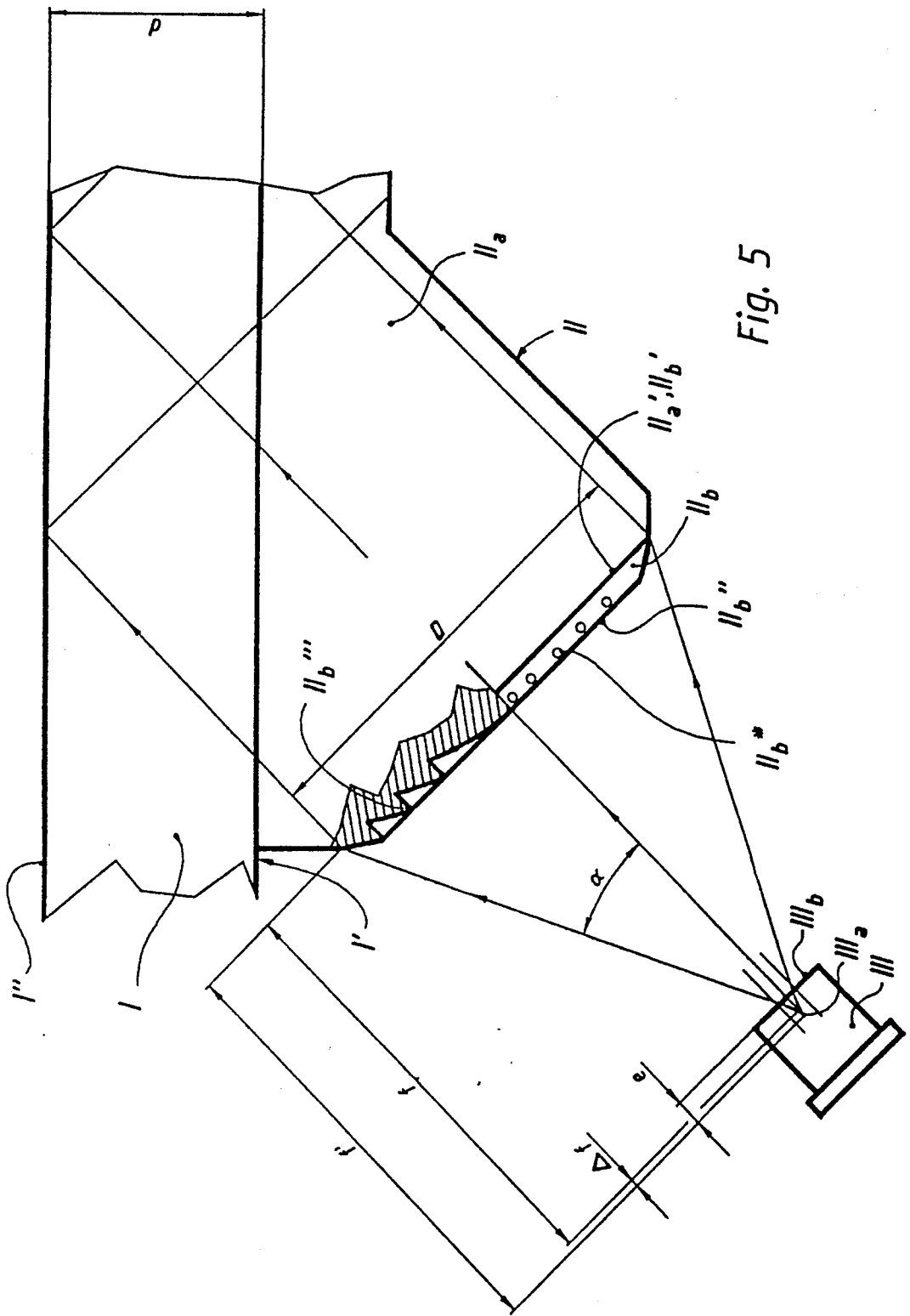
FIG. 5 is a sensor device as in FIG. 1 with a fourth lens variant.

In the embodiment shown in FIG. 5, the lens surface IIb" is again in stepped form. The outline of the individual steps also is fashioned according to a polynomial selected to be equal to or greater than third degree. In said variant, while the widths of the individual steps do in fact differ, the points of origin $II_b'''$ of the steps again lie in the same depth plane.

In such embodiments, which are possibly also provided with imperfections, the intensity profile is further homogenized.

If such embodiments are used, care must be taken to prevent any rays from being launched at the surface regions of the lens surface IIb" lying parallel to the longitudinal axis of the lens IIb by employing suitable measures—e.g. by matting said surface regions.

While the best mode for carrying out the invention has been described in detail, those familiar with the art to which this invention relates will recognize various alternative designs and embodiments for practicing the invention as defined by the following claims.

What is claimed is:

1. A sensor device for detecting the degree of wetting of a transparent windscreen by drop-shaped precipitation which lies on an outer surface thereof, the sensor device comprising:

a beam transmitter located proximate an inner surface of the windscreen, a beam receiver in optical communication with the transmitter, and a beam guide element positioned therebetween, the guide element being affixed to an inner surface of the windscreen and having two trapezoidal faces oriented orthogonally to each other, each face being provided with an aspherical lens which is associated with the beam transmitter or receiver;

the beam transmitter, receiver and guide element being positioned so that rays emitted by the beam transmitter pass through the guide element before and after reflection by the windscreen with an intensity which is a function of the precipitation on the windscreen;

the receiver supplying a signal to a control unit and thence to a motor-operated windscreen wiping device in response to the quantity of precipitation;

the lenses (IIb) being spaced apart from the associated transmitter (III) or receiver and including a lens surface (IIb") facing the transmitter (III) or receiver;

each lens surface (IIb") being at least partially configured according to a polynomial of or greater than the third degree and being developed to form a body of rotation.

2. A sensor device as in claim 1, wherein each lens surface (IIb") is continuous without discrete steps from the edge to the center of the lens (IIb).

3. A sensor device as in claim 1, wherein each lens surface (IIb") is graduated in steps from the edge to the center of the lens (IIb).

4. A sensor device as in claim 1, wherein the beam transmitter (III) associated with the lens (IIb) is provided with a planar ray exit surface (IIIb) which refracts the divergent beam of rays and has, disposed at a specific distance (e) from this surface, a quasi point-like radiation source (IIIa), and wherein the radiation source (IIIa) is disposed at a specific distance (f') from the mathematical base (IIb') of the lens (IIb), said distance being determined in dependence upon the distance (e) and the thickness as well as the refractive index of the ray exit surface (IIIb).

5. A sensor device as in claim 2, wherein the beam transmitter (III) associated with the lens (IIb) is provided with a planar ray exit surface (IIIb) which refracts the divergent beam of rays and has, disposed at a specific distance (e) from this surface, a quasi point-like radiation source (IIIa), and wherein the radiation source (IIIa) is disposed at a specific distance (f') from the mathematical base (IIb') of the lens (IIb), said distance being determined in dependence upon the distance (e) and the thickness as well as the refractive index of the ray exit surface (IIIb).

6. A sensor device as in claim 3, wherein the beam transmitter (III) associated with the lens (IIb) is provided with a planar ray exit surface (IIIb) which refracts the divergent beam of rays and has, disposed at a specific distance (e) from this surface, a quasi point-like radiation source (IIIa), and wherein the radiation source (IIIa) is disposed at a specific distance (f') from the mathematical base (IIb') of the lens (IIb), said distance being determined in dependence upon the distance (e) and the thickness as well as the refractive index of the ray exit surface (IIIb).

7. A sensor device as in claim 1, wherein the lenses (IIb) have a diameter (D) at least twice as great as the thickness (d) of the pane (I).

8. A sensor device as in claim 4, wherein the lenses (IIb) have a diameter (D) at least twice as great as the thickness (d) of the pane (I).

9. A sensor device as in claim 5, wherein the lenses (IIb) have a diameter (D) at least twice as great as the thickness (d) of the pane (I).

10. A sensor device as in claim 6, wherein the lenses (IIb) have a diameter (D) at least twice as great as the thickness (d) of the pane (I).

11. A sensor device as in claim 1, wherein at least the lens (IIb) associated with the beam transmitter (III) is provided, in a manner which decreases from the center of the lens (IIb) towards its edge, with selectively arranged imperfections (IIb*) to effect a uniform intensity distribution of the rays of the beam.

12. A sensor device as in claim 2, wherein at least the lens (IIb) associated with the beam transmitter (III) is provided, in a manner which decreases from the center of the lens (IIb) towards its edge, with selectively arranged imperfections (IIb*) to effect a uniform intensity distribution of the rays of the beam.

13. A sensor device as in claim 3, wherein at least the lens (IIb) associated with the beam transmitter (III) is provided, in a manner which decreases from the center of the lens (IIb) towards its edge, with selectively arranged imperfections (IIb*) to effect a uniform intensity distribution of the rays of the beam.

14. A sensor device as in claim 7, wherein at least the lens (IIb) associated with the beam transmitter (III) is provided, in a manner which decreases from the center of the lens (IIb) towards its edge, with selectively arranged imperfections (IIb*) to effect a uniform intensity distribution of the rays of the beam.

15. A sensor device as in claim 11, wherein the imperfections (IIb*) are printed onto the lens surface (IIb'').

16. A sensor device as in claim 11, wherein the imperfections (IIb*) provided on the lens surface (IIb'') are realized by use of an etching technique.

17. A sensor device as in claim 11, wherein the imperfections (IIb*) are formed by recesses introduced into the lens surface (IIb'').

18. A sensor device as in claim 11, wherein the imperfections (IIb*) are formed by bumps disposed on the lens surface (IIb'').

* * * * *